United States Patent [19]
Solberg et al.

[11] Patent Number: 5,332,249
[45] Date of Patent: Jul. 26, 1994

[54] TRAILER DEVICE

[76] Inventors: Dean C. Solberg, 628 24th Ave. NW.;
Dennis W. Eklund, R.R. 1, both of Minot, N. Dak. 58701

[21] Appl. No.: 873,444

[22] Filed: Apr. 24, 1992

[51] Int. Cl.$^5$ ............................................. B60P 3/10
[52] U.S. Cl. .................................. 280/414.1; 414/477
[58] Field of Search ....................... 414/477, 482, 483; 280/414.1

[56] References Cited

U.S. PATENT DOCUMENTS

| | | | |
|---|---|---|---|
| 4,099,279 | 7/1978 | Park | 414/482 X |
| 4,286,346 | 9/1981 | Weik | 414/477 X |
| 4,911,459 | 3/1990 | Smyly, Sr. | 280/414.1 |
| 5,013,206 | 5/1991 | Ernst et al. | 280/414.1 |

*Primary Examiner*—Karin L. Tyson
*Assistant Examiner*—Victor E. Johnson
*Attorney, Agent, or Firm*—Robert E. Kleve

[57] ABSTRACT

The invention comprises a mobile frame and a floatation frame having a tractor pivotally mounted to its rearward end. Rolling members are mounted along the bottom of the floatation frame and tractor so that they may roll along the mobile frame. The floatation frame has floats along its rearward end and the tractor has a brake member to lock the tractor at a location on the mobile frame with a floatation member connected to the brake member for actuating the brake member when the floatation member is immersed in water by the floatation member floating upward, whereby the mobile frame may be rolled into the water to immerse its rearward end, and the brake member may be released to allow the tractor and floatation frame to roll rearward on the mobile frame into the water until the floatation member of the brake member is immersed and floats upward to lock the brake member, thereby locking the floatation frame and tractor rearward on the mobile frame with the rear end of the floatation frame afloat on the water. A boat may then be powered forward onto the floatation frame and will engage the floatation member of the tractor and release the tractor from the mobile frame whereupon the boat may be further powered forward until substantially all the boat, floatation frame and tractor rest over the mobile frame.

3 Claims, 4 Drawing Sheets

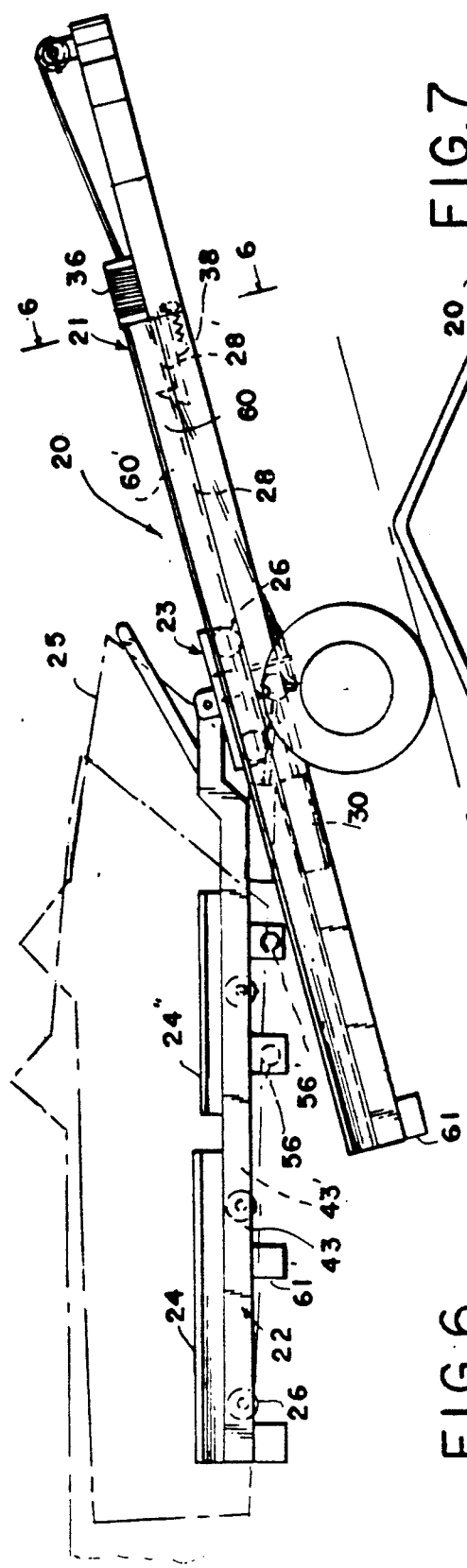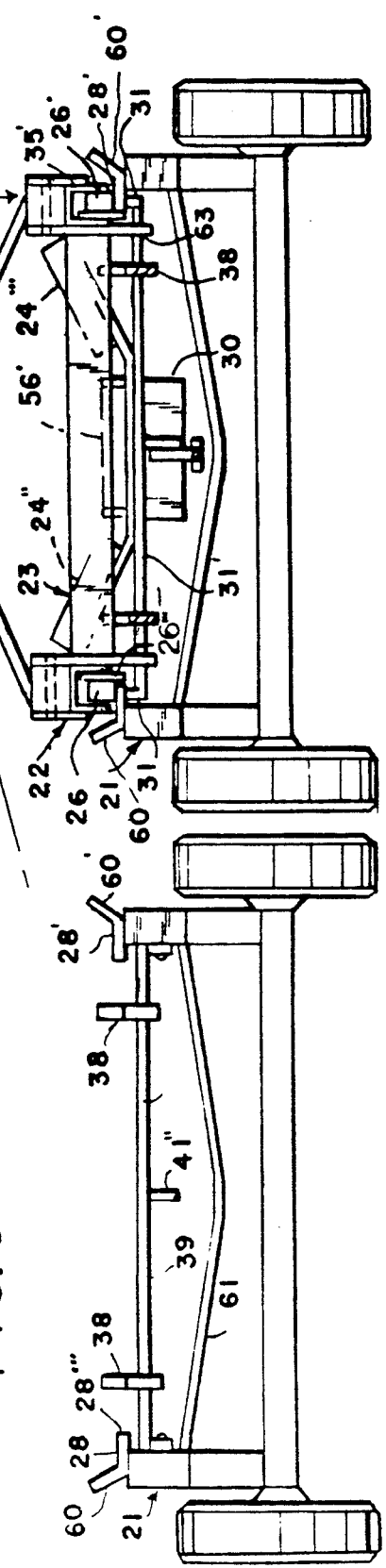

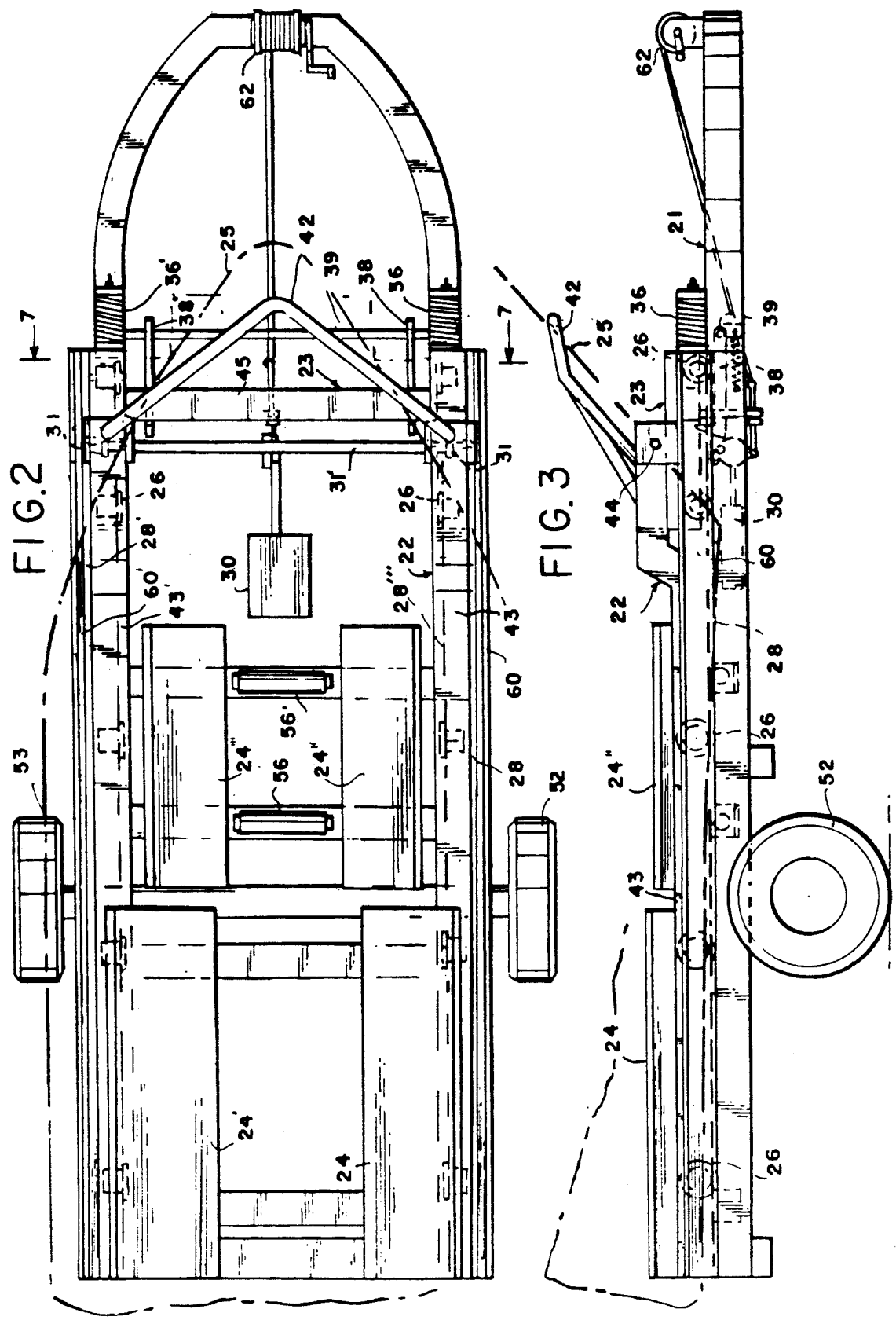

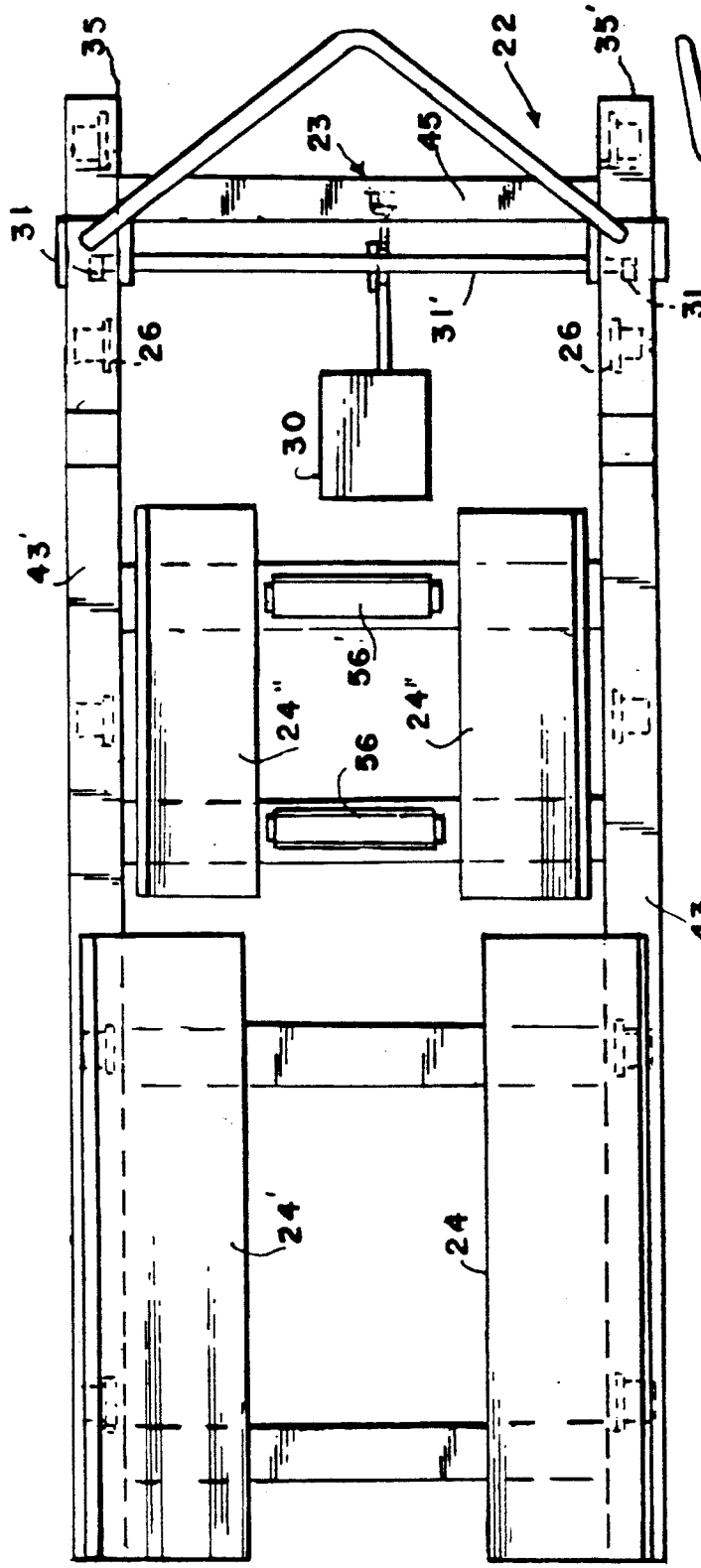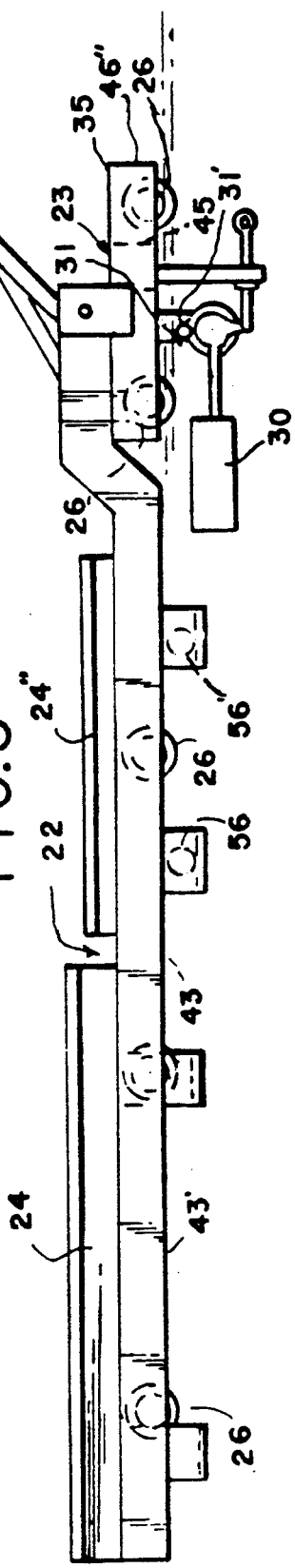
FIG. 4
FIG. 5

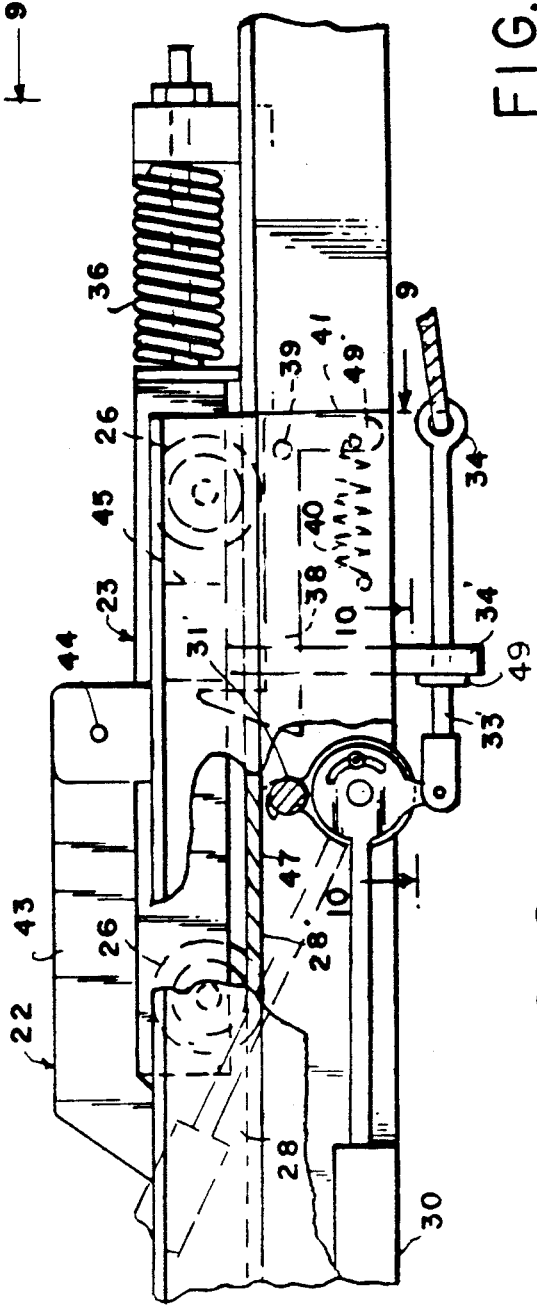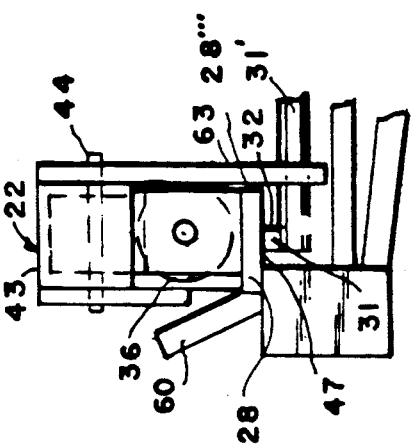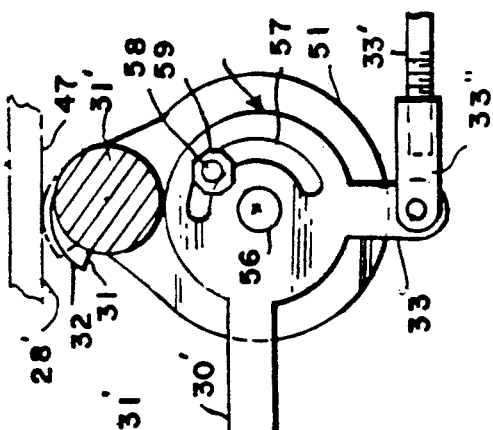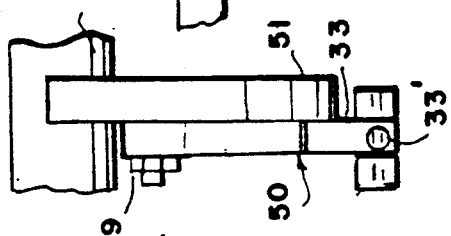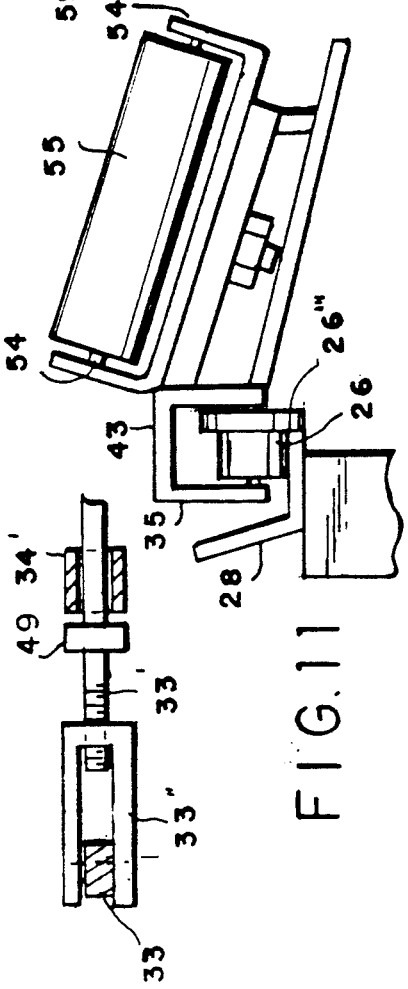

TRAILER DEVICE

This invention relates to boat trailers.

It is an object of the invention to provide a novel boat trailer having a pair of frames, with one of the frames having wheels for transporting the device on the ground, and the other frame having floatation members for floating the frame in the water with one end attached to the one frame in pivoting rolling contact and with the floatation frame adapted to receive a boat while in the water and to be moved onto the one frame for transporting the boat and frames on the ground.

It is another object of the invention to provide a novel boat trailer having a trailer with a floatation frame enabling a boat to be loaded onto the floatation frame and the floatation frame loaded onto the trailer by powering the boat onto the floatation frame and powering the boat with the floatation frame onto the trailer while the trailer in in the water, with braking means to brake the floatation frame from loading onto the trailer while powering the boat onto the floatation frame.

It is a further object of the invention to provide a novel boat trailer which easily and rapidly loads a boat thereon by powering the boat onto the trailer.

Further objects and advantages of the invention will become apparent as the description proceeds and when taken in conjunction with the accompanying drawings wherein.

BRIEF DESCRIPTION OF THE DRAWINGS:

FIG. 1 is a side elevational view of the boat trailer invention, illustrating the mobile frame of the trailer at an angle partly submerged in the water at the edge of the water, and illustrating the sliding floating frame of the trailer floating at its rearward end and attached at its forward end to a tractor member, with the float member and tractor or trolley having been rolled down the mobile frame and braked at the water surface to receive a boat.

FIG. 2 is a top plan view of the boat trailer, including the mobile and float frame, and illustrating the boat and float member after the boat has been powered onto the float frame and mobile frame.

FIG. 3 is a side elevational view of the boat trailer, including the mobile and float frame, and illustrating the boat and float member after the boat has been powered onto the float frame, and the boat has powered the boat and float frame Onto the mobile frame for road transport.

FIG. 4 is a top plan view of the float frame of the trailer.

FIG. 5 is a side elevational view of the float frame.

FIG. 6 is a front elevational view of the mobile frame of the trailer.

FIG. 7 is a front elevational view of the float frame on the mobile frame, taken along line 7—7 of FIG. 2.

FIG. 8 is a fragmentary enlarged side elevational view of the tractor at the forward end of the mobile frame.

FIG. 9 is a cross-sectional fragmentary view taken along line 9—9 of FIG. 8.

FIG. 10 is a fragmentary view of the float member adjustment plates taken along line 10—10 of FIG. 8.

FIG. 11 is a fragmentary front view of a modified roller float for the float frame.

FIG. 12 is a front view of the float plates.

FIG. 13 is an enlarged side view of the float plates.

BRIEF DESCRIPTION OF PREFERRED EMBODIMENT

Briefly stated, the invention comprises a boat trailer having a mobile frame and a floatation frame, said float frame having a tractor or dolly at its forward end mounting in rolling relation along the rails of the mobile frame, whereby the floatation frame and its tractor may be rolled down the mobile frame, with the mobile frame at an angle partly submerged in the water, and the rear end of the float frame at an horizontal plane afloat on the water, float actuated brake means stopping the tractor at the surface of the water, while the floatation frame is afloat on the surface, so as to prevent the floatation frame from being pushed back up the mobile frame by the action of the boat powering onto the mobile frame, said floatation frame being receivable of the boat with the boat engaging the brake means upon being fully located on the floatation frame, so that the boat can power the float frame and boat fully onto the mobile frame, with cushion and lock means on the mobile frame cushioning and locking the float frame when fully onto the mobile frame of the trailer.

Referring more particularly to the drawings, in FIG. 1, the boat trailer invention is illustrated having a mobile frame 21 and a floatation frame 22. The floatation frame 22 has a tractor 23 pivotally mounted to the forward end of the floatation frame. A pair of float members 24 and 24' are mounted to the rear of the floatation frame, and a pair of spaced float members 24" and 24'" are mounted to the forward portion of the float frame. A boat 25 in phantom lines is illustrated mounted no the float frame in FIGS. 2 and 3.

The tractor or dolly 23 of the float frame 22 has four rollers 26 which are rotatably mounted to the tractor frame to roll the tractor up and down the rails 28 and 28' of the mobile frame. A floatation brake 29 is mounted to the tractor. The brake has a float 30 which actuates cams 31, which cams have outer surfaces with gradually increasing diameters 32 to gradually engage and lock the cams to the rails and thereby lock the tractor and float frame in a fixed position on the mobile frame. The float member 30 in engaging the water is caused to float upward actuating the brake lock. The float 30 has an arm 30' fixed thereto at its one end with its other end adjustably fixed to a lateral shaft 31', through a pair of discs 50 and 51. The cams 31 project outward and upward toward the underside of the rails. The float member 30, upon reaching the water, will, upon immersion being made of floatation material, float upward relative to the tractor thereby pivoting or rotating the shaft 31' axially upward, which is pivotally mounted to the side frame members 46 and 46' of the tractor. The rotation of the shaft 31' upward pivots the cams upward to gradually engage the rails along their underside 47 is a near perpendicular position in a wedging action to lock the cams to the rails.

The adjustably fixed connection of the arm 30' and shaft 31' is provided by one disc 50 being fixed to the arm 30' and another disc 51 pivotally mounted coaxially to the disc 50 which disc 51 is fixed to the shaft 31, with a threaded rod and slot and tightening nut connection between the two discs to adjust their relative arcuate position. A lug 33 is fixed to the bottom of disc 50. A rod 33' has an eyelet 34 at one end is slidably mounted in a sleeve 34' which sleeve 34' is fixed to the cross member 45 of the tractor. The other end of the rod 33' is threaded into a U shaped member 33', and the U shaped member has its outer pair of legs 33''' pivotally mounted to the lug 33 on opposite sides thereof. The pulling of the rod 33' from left to right, when viewed from FIG. 10, will pivot the lug and shaft and thereby pivot the float and cams downward releasing the cams from the rails 28 and 28' unlocking the tractor from the mobile frame.

The, float actuated brake mechanism for engaging and disengaging the cams 31 has a pair of discs 50 and 51. Disc 51 is fixed to the lateral shaft 31', which, in turn, is fixed to the cams 31. The other disc 50, has the lug 33 providing the pivotal connection at its bottom to the U member 33''. The rod 33' has a rope attached to the eyelet 34 to enable the operator to slide the rod 33' from left to right when viewed from FIG. 10, with a limiting flange 49 fixed to the rod 33' which limits the movement of the rod to the right by engaging the sleeve 35

The disc 50 is pivotally mounted to the disc 51 at pivot point 56, and the disc 50 has an arcuate slot 57 following the arc of this pivot. A threaded rod 58 is fixed to the disc 51 and projects through the slot. A nut 59 is threaded down the rod 58 against the disc 50 to tighten disc 50 to disc 51 in fixed relation. The disc 50 can be pivoted relative to the disc 51 about the pivot point 56 to adjust the angle of the float, attached to disc 50, relative to the tractor, and the nut 59 retightened thereby tightening the discs together in a fixed adjusted position.

The cam shaft 31' is rotatably mounted in projecting flanges 63 which flanges 63 are fixed to the bottom of the side channels 35 and 35' of the tractor so that the tractor carries the cam shaft.

The mobile frame 21 has a pair of upward extending flanges 60 and 60' extending along the outside edges of the rails 28 and 28' of the frame. Also, a pair of springs 36 and 36' are mounted to the rearward portion of the mobile frame and limit the rolling movement of the tractor to the rear of the frame; and a pair of stops 37 and 37' are provided at the forward end of the mobile frame to limit and stop the movement of the tractor in that direction. Also, the cams 31, being beneath the horizontal leg of the rails 28 and 28', prevent the tractor from lifting off the rails of the mobile frame 21.

A pair of pivotally mounted latch plates 38 and 38', on each side of the mobile frame, are fixed to a rod 39, which rod is pivotally mounted to the sides of the mobile frame to pivot about its longitudinal axis. A pair of springs 40 are connected between the mobile frame and the latch plates to spring urge the locking notched ends 41 of the latch plates clockwise upward about their axis 40'. A center lug 41' is fixed to the center of rod 39 for the operator to grasp to pivot the latch plates downward for releasing the tractor from the float frame.

The float frame 22 has a curved bow rod 42. The bow rod curves downward at its outer end portions and is fixed to the top of the tractor. A pair of brace rods are fixed between the bow rod and tractor on each side of the tractor.

The tractor 23 is pivotally mounted to the float frame 22 by pins at pivotal axes 44; and the tractor or dolly has a rectangular metal cross frame member 45 fixed across between the longitudinal elongated metal channel frame members 35 and 35'; and the shaft 31' of the float brake mechanism is rotatably mounted in the frame members 35 and 35'.

When the tractor rolls up the rails 28 and 28' of the mobile frame toward the rear of the mobile frame, its cross frame member 45 engages the tapered surfaces 38'' of latch plates 38 and 38' and cams the latch plates downward allowing the cross frame member to pass over the pointed ends 38''' of the latch plates. Whereupon, the springs, once the cross member has passed over, will urge the pointed ends of the latch plates clockwise upward beside the cross member 45, with its latching surfaces engaging the side of the cross member locking it from moving forward.

The float frame 22 has a plurality of rollers 26 rotatably mounted to the inverted U shaped side frame channel members 43 and 43' of the frame for rolling support of the frame on the rails 28 and 28'.

The rollers 26 for the tractor have annular projecting inner flanges 26''', which project against the inner edges 28''' of rails of the mobile frame to prevent the tractor from moving to one side or the other and to keep it in longitudinal alignment with the rails of the mobile frame. Also, the float frame rollers 26' have annular projecting inner flanges 26''' for the same reason.

The rod 33' has a yoke 33'' adjustable threaded onto the end of the rod 33', and the yoke 33'' is pivotally mounted to the lug 33 of the shaft 31' to provide the;-pivotal connection between the shaft and rod. The rod 33' may be threaded forward or rearward along the threaded bore of the yoke to change the distance the cams 31 move away from their engagement with the underside 47 of the rails, before the limiting flange 49, fixed to rods 34' engages the sleeve 35 fixed to the cross member 45.

Cross members 61 are fixed across the mobile frame, between the rails 28 and 28' and are curved downward to facilitate loading a large boat onto the trailer without the keel of the boat contacting the mobile frame. Similarly, the cross members 61' of the float frame 22 curve downward for the same reason.

A winch 62 is fixed to the forward end of the mobile frame for drawing the tractor and float frame forward onto the mobile frame, by attaching the hook to the eyelet as already described. The frame has a pair of wheels 52 and 53 rotatably mounted thereto.

The four rollers 26 of the tractor are rotatably mounted in the ends of the two parallel side frame channel members 35 and 35' of the tractor. The frame members 35 and 35' are channel members having a inverted generally U shaped cross section.

The front forward ends 46'' of the side members 35 and 35' will engage and slightly compress the springs 36 and 36' of the mobile frame shortly before or shortly after the member 45 passes over the points 38'' of the latch plates 38 and 38'. The tractor must be moved forward with moderate force enough to compress the springs sufficiently to allow the cross member to pass over the points so that they can spring up under their spring urging and engage the face 45' of the cross member 45 and look it against rearward movement, if the compression begins before the cross member has passed over the points.

OPERATION

The boat trailer invention 20 will operate approximately as follows:

Moving The Float Member Downward Along the Mobile Frame For Loading the Boat Onto the Frame The trailer device 20 will be rolled on the wheels of the mobile frame into the water at an angle, as illustrated in FIG. 1, until the rear end of the mobile frame is submerged in the water at the edge of a lake for example, as illustrated in FIG. 1. Whereupon, the latch plates 38 and 38' on the mobile frame will be pivoted counterclockwise downward when viewed from FIG. 1 by the operator grasping and pivoting the lug 41", until the cross member 45 of the tractor of the float frame is free of the latches 38 and 38'. The release of the tractor from the latch plates is accomplished by the operator pivoting the other ends 49 of the latch plates 38 and 38' upward causing the rod 39 and latch portions 38' at the pointed ends to pivot downward until the points clear the cross member 45 on the tractor. Whereupon, the tractor and its float frame can roll down the rails 28 and 28', with the rear free end of the float frame floating more and more horizontal on the surface of the water and until the forward part of the float frame and the tractor reach the level of the surface of the water. When the tractor or dolly reaches the level of the surface of the water, the float member 30 will be immersed into the water and will float upward relative to the tractor in reaction to its buoyancy in in the water. Its upward movement will pivot the shaft 31' clockwise, when viewed from FIG. 13, causing the cams 31 on the shaft to pivot upward and engage against the bottom of the rails of the mobile frame, locking the tractor to the mobile frame so that it cannot move in either direction along the rails of the mobile frame.

Whereupon, the boat 25, shown in phantom lines, will be powered onto the float frame 22, as illustrated in FIG. 1, and the locking action of the brake 29 upon the tractor or dolly prevents the float frame 22 and tractor from moving forward along the rails of the mobile frame, in reaction to the boat being powered onto the float frame, forward from left to right when viewed from FIG. 1. Rather the tractor and float frame, because of the braking action, remains stationary on the mobile frame as the boat moves forward onto the float frame toward the bow rod 42. As the bow of the boat reaches the bow rod, the keel of the boat, immediately prior, will reach the float member 30 of the tractor and will engage the float member on its top and pivot it downward, pivoting the cams away from the bottom of the rails thereby freeing the tractor and float frame from its lock to the rails of the mobile frame.

The boat, though fully on the float frame, may be continued to be powered forward, with the action now moving the boat, float frame and tractor forward along the mobile frame. When the tractor, moving forward, reaches the latch plates 38 of the mobile frame, its cross member will cam the point of the latch plates downward so that the tractor member can continue moving forward. At this point, or a short distance thereafter, the forward ends of the tractor side members will engage the springs 36 and 36' and begin compressing them as the tractors moves forward. The boat will have sufficient power and the spring sufficient compression length, that the springs can be compressed far enough to allow the cross member to pass completely over the points of the latch plates, and the latch plate springs can urge the latches at their latch point end upward until the face of the latch plate pointed portions engages the side of the cross member thereby locking the tractor from moving back rearward.

The boat trailer 20 is now fully loaded and ready to haul the boat to another site, if desired, as illustrated in FIGS. 2 and 3.

Specifically when powering the boat onto the float frame, the bow of the boat will be driven between the floats 24 on the one side and floats 24' on the other side, with the keel of the boat passing over the curved cross members, which bend downward sufficiently to allow the keel of the boat to pass over so that the boat will rest on the sides of the float members 24 and 24' rather than the curved cross members. In driving the boat forward onto the float frame the boat will push the float member downward into the water slightly to allow the boat to move onto the float frame.

Once the boat has been powered onto the float frame, the float frame, with the boat thereon, may be winched onto the mobile frame fully, by attaching the hook of the winch to the eyelet 34 of the rod 33 and winding the cable which will pull the rod from left to right, when viewed from FIG. 1. This pivots the cams 31 counterclockwise away from the rails of the mobile frame, freeing the tractor from its brake lock on th mobile frame. The rod 33 will be pulled further to the right until the enlarged flange 34' on the rod 34 engages the sleeve 35, whereupon further winding of the cable will pull the rod 33' and the tractor forward, with the tractor free to roll on the rails of the mobile frame. The tractor will thereupon be winched forward until the float frame engages the compression springs and becomes locked in its fully loaded position, as already described.

A modified float roller 55 may be rotatably mounted to the float frame, replacing the floation panels 24 and made of floatation material for floating the frame and provide a rolling support for the bottom of the boat.

A pair of rollers 56 and 56' are rotatably mounted to the two front cross members 61' of the float frame to rotatably support the keel of the boat, as it travels onto the float frame.

The two rear,cross members 61" of the float frame may also have rollers mounted to them, if necessary.

It will be obvious that various changes and departures may be made to the invention without departing from the spirit and scope thereof; and accordingly, it is not intended that the invention be limited to that specifically described in the specification or as illustrated in the drawings, but only as set forth in the appended claims wherein:

What is claimed is:

1. A boat trailer comprising an elongated mobile frame having a forward and rearward end; an elongated floatation frame having a forward and rearward end; a tractor pivotally mounted to the forward end of the floatation frame; said mobile frame having parallel elongated rails extending along the length on opposite lateral sides of the mobile frame; said tractor and mobile frame each having a bottom and rollers along each respective bottom at intervals aligned with the rails of the mobile frame to enable the floatation frame and tractor to roll on the rollers on the rails along the length of the mobile frame; float members attached to the rearward end of the mobile frame for keeping the rearward end of the floatation frame afloat upon a surface of a body of water; brake means on the tractor actuatable to brake and lock the tractor at a location along the length of the rails of the mobile frame; float means connected to the brake means and carried with the brake means on the tractor to actuate the brake means whereby the mobile frame may be rolled rearward into a body of water to submerge the rearward end of the mobile frame in the water; and thereafter, the brake means, when deactuated, may allow the floatation frame and tractor to roll rearward along the mobile frame until the float means of the brake means reaches the surface of the body of water, so that the water will cause the float means on the brake means to float upward relative to the floatation frame and actuate the brake means to lock the tractor and forward end of the floatation frame in an actuate position on the mobile frame, with the rearward end of the floatation frame afloat on the water; said brake means being deactuatable upon engagement with a bottom forward edge of a boat, so that the boat may be powered onto the floatation frame to the tractor and said forward bottom edge may engage means on the brake means to unlock the tractor so that the boat may be powered further forward in combination with the floatation frame and tractor onto the mobile frame, until substantially all the boat, floatation frame and tractor rest over the mobile frame.

2. A boat trailer having an elongated mobile frame with forward and rearward ends and wheels on the mobile frame for ground transportation; an elongated floatation frame having forward and rearward ends with rolling means along the forward end for rolling the forward end of the floatation frame along the mobile frame; float means on the rearward end of the floatation frame to maintain the rearward end of the floatation frame afloat on the surface of a body of water; pivot means pivotally connecting the rearward end of the floatation frame with the forward end of the floatation frame; brake means on the floatation frame to lock the floation frame to the mobile frame at a location along the length of the mobile frame; means to actuate the brake means; means on the floatation frame, to deactuate the brake means to release and unlock the floatation frame from the mobile frame; whereby the mobile frame may be wheeled rearward at angle into the body of water to submerge the rearward end of the mobile frame at an angle in the water, and the brake means may be deactuated to unlock the floatation frame from the mobile frame so that the floatation frame may roll rearward and downward along the mobile frame at an angle into the water and the water will cause the rearward end of the floatation frame to float on the surface of the water pivoting about the pivotal connection, the means to actuate the brake means may be actuated to lock the floatation frame rearward down the mobile frame, so that thereafter the boat may be powered forward onto the floatation frame toward the forward end of the floatation frame to a position at least substantially fully forward on the floatation frame, means on the floatation frame engagable with the boat when the boat is substantially fully forward on the floatation frame to deactuate the brake means to release and unlock the floatation frame from the mobile frame, so that the boat may be thereafter further powered forward in the water to power the boat and floatation frame forward on the mobile frame until the boat and floatation frame are at least substantially fully forward on the mobile frame; means to lock the the floatation frame at the fully forward position on the mobile frame.

3. A boat trailer comprising an elongated mobile frame having a forward end and rearward end; an elongated floatation frame having a forward and rearward end; a tractor pivotally mounted to the forward end of the floatation frame; said mobile frame having parallel, elongated rails extending along the length on opposite lateral sides of the mobile frame; said tractor and mobile frame each having a bottom and rollers along each respective bottom at intervals aligned with the rails of the mobile frame to enable the floatation frame and tractor to roll on the rollers on the rails along the length of the mobile frame; float members attached to the rearward end of the floatation frame for keeping the rearward end of the floatation frame afloat upon a surface of a body of water; brake means on the tractor actuatable to brake and lock the tractor at a location along the length of the rails of the mobile frame; float means connected to the brake means and carried with the brake means on the tractor to actuate the brake means whereby the mobile frame may be rolled rearward into a body of water to submerge the rearward end of the mobile frame in the water; the brake means, when deactuated, may allow the floatation frame and tractor to roll rearward along the mobile frame until the float means of the brake means engages and is immersed in the water so that the water will cause the float means on the brake means to float upward relative to the floatation frame to actuate the brake means to lock the tractor and thereby lock the floatation frame adjacent the water, with the rearward end afloat on the water; whereupon a boat may be powered onto the floatation frame until fully forward on the floatation frame; and the brake means may be released unlocking the floatation frame and tractor from the mobile frame so that the boat may be further powered forward until substantially all the boat, floatation frame and tractor rest over the mobile frame.

* * * * *